US011077779B2

(12) United States Patent
Ruidisch (10) Patent No.: US 11,077,779 B2
(45) Date of Patent: Aug. 3, 2021

(54) VEHICLE SEAT HAVING AN ADJUSTMENT FUNCTION

(71) Applicant: GRAMMER AG, Amberg (DE)

(72) Inventor: Michael Ruidisch, Amberg (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 16/716,897

(22) Filed: Dec. 17, 2019

(65) Prior Publication Data

US 2020/0189435 A1    Jun. 18, 2020

(30) Foreign Application Priority Data

Dec. 18, 2018   (DE) .......................... 102018132594.0

(51) Int. Cl.
*B60N 2/868*   (2018.01)
*B60N 2/64*    (2006.01)

(52) U.S. Cl.
CPC ............... *B60N 2/868* (2018.02); *B60N 2/64* (2013.01)

(58) Field of Classification Search
CPC .......... B60N 2/2222; B60N 2/38; B60N 2/64; B60N 2/868; B60N 2002/0216; B60N 2002/022; B60N 2002/0288; B60N 2205/30
See application file for complete search history.

(56) References Cited

U.S. PATENT DOCUMENTS

| 937,343 | A | * | 10/1909 | Wallace | B60N 2/885 297/407 |
| 1,257,427 | A | * | 2/1918 | Underwood | B60N 2/885 297/407 |
| 3,300,249 | A | * | 1/1967 | Schneider | A47C 7/38 297/408 |
| 3,342,528 | A | * | 9/1967 | Radke | A47C 7/48 297/383 |

(Continued)

FOREIGN PATENT DOCUMENTS

DE       10307481     9/2004
DE       102005008159  6/2006

(Continued)

OTHER PUBLICATIONS

Extended Search Report for European Patent Application No. 19210387.7, dated May 18, 2020, 3 pages.

(Continued)

*Primary Examiner* — James M Ference
(74) *Attorney, Agent, or Firm* — Sheridan Ross P.C.

(57) ABSTRACT

The invention relates to a vehicle seat having a seat part and a backrest part comprising a first backrest portion and a second backrest portion arranged above it in the seat height direction, wherein the second backrest portion is displaceable relative to the first backrest portion by means of a displacement movement directed at least in the seat width direction, wherein in a first displaced position of the second backrest portion a mechanical interaction is formed between (Continued)

the first backrest portion and the second backrest portion, which secures the first displaced position of the second backrest portion and which can be released by means of a force exerted on the second backrest portion and acting in the direction of the displacement movement.

17 Claims, 11 Drawing Sheets

(56) References Cited

U.S. PATENT DOCUMENTS

| | | | | |
|---|---|---|---|---|
| 3,393,938 | A * | 7/1968 | Meyer | B60N 2/882 |
| | | | | 297/397 |
| 4,108,493 | A * | 8/1978 | Naus | B60N 2/77 |
| | | | | 297/337 |
| 4,634,176 | A * | 1/1987 | Scott | A47C 7/425 |
| | | | | 297/230.13 |
| 5,108,150 | A * | 4/1992 | Stas | A47C 7/383 |
| | | | | 297/397 |
| 5,154,477 | A * | 10/1992 | Lacy | A47C 7/383 |
| | | | | 297/397 |
| 5,211,696 | A * | 5/1993 | Lacy | A47C 7/383 |
| | | | | 297/397 |
| 5,772,280 | A * | 6/1998 | Massara | B60N 2/2222 |
| | | | | 297/216.12 |
| 6,305,749 | B1 * | 10/2001 | O'Connor | A47C 7/383 |
| | | | | 297/397 |
| 6,648,416 | B2 * | 11/2003 | O'Connor | A47C 7/383 |
| | | | | 297/397 |
| 6,893,095 | B2 * | 5/2005 | Schambre | B60N 2/856 |
| | | | | 297/406 |
| 7,178,874 | B2 * | 2/2007 | Demski | A47C 7/38 |
| | | | | 297/391 |
| 7,264,313 | B2 * | 9/2007 | Clough | B60N 2/885 |
| | | | | 297/407 |
| 9,221,362 | B2 * | 12/2015 | Schneider | B60N 2/868 |
| 9,283,871 | B2 * | 3/2016 | Uebelacker | B60N 2/38 |
| 9,610,864 | B2 * | 4/2017 | Uebelacker | B60N 2/868 |
| 9,682,781 | B2 * | 6/2017 | Brandt | B64D 11/062 |
| 2003/0151279 | A1 * | 8/2003 | Fowler | B60N 2/885 |
| | | | | 297/216.12 |
| 2003/0155797 | A1 * | 8/2003 | Amirault | B60N 2/2872 |
| | | | | 297/250.1 |
| 2003/0178880 | A1 * | 9/2003 | Hannah | A61G 5/121 |
| | | | | 297/406 |
| 2013/0134753 | A1 * | 5/2013 | Buehlmeyer | B60N 2/809 |
| | | | | 297/284.1 |
| 2013/0175837 | A1 * | 7/2013 | Buehlmeyer | B60N 2/753 |
| | | | | 297/284.1 |
| 2015/0015045 | A1 * | 1/2015 | Uebelacker | B60N 2/2222 |
| | | | | 297/383 |
| 2020/0189435 | A1 * | 6/2020 | Ruidisch | B60N 2/868 |

FOREIGN PATENT DOCUMENTS

| | | |
|---|---|---|
| DE | 102005009126 | 9/2006 |
| DE | 102006052207 | 5/2008 |
| DE | 112011100763 | 1/2013 |
| DE | 102011055895 | 6/2013 |
| DE | 102011055897 | 6/2013 |
| DE | 102012104184 | 11/2013 |
| DE | 102013110445 | 12/2014 |
| EP | 2818357 | 12/2014 |
| EP | 2818358 | 12/2014 |
| FR | 2927855 | 8/2009 |
| FR | 2929185 | 10/2009 |
| FR | 2932429 | 12/2009 |
| FR | 3061457 | 7/2018 |

OTHER PUBLICATIONS

Official Action for German Patent Application No. 102018132594.0, dated Oct. 28, 2019, 3 pages.
Official Action with English Translation for Korea Patent Application No. 10-2019-0168670, dated Jan. 20, 2021, 5 pages.

* cited by examiner

VEHICLE SEAT HAVING AN ADJUSTMENT FUNCTION

CROSS-REFERENCE TO RELATED APPLICATION

This application claims the benefit of German Patent Application No. DE 102018132594.0 filed Dec. 18, 2018, the entire contents of which are incorporated herein by reference in its entirety.

FIELD

The invention relates to a vehicle seat having a seat part and a backrest part comprising a first backrest portion and a second backrest portion arranged thereabove in the seat height direction, wherein the second backrest portion is displaceable relative to the first backrest portion by means of a displacement movement directed at least in the seat width direction.

BACKGROUND

It is known from the prior art to equip vehicle seats, such as commercial vehicle seats of tractors, construction machines or forklifts, with adjustment functions. These relate, for example, to a first part of the backrest, in relation to which a second part of the backrest is displaceable from an initial stance into a displaced position. In order to ensure good support and therefore sufficient relief for the vehicle driver, a support surface should always be as large as possible in all driving positions, even if the driver changes between two extremely different driving positions.

For example, the driver holding the steering wheel with his left hand can initiate this displacement by applying pressure with his right shoulder to the second part of the backrest. He is subsequently able to support his shoulder or upper back on this part of the backrest and look back in order to better observe the region behind the vehicle.

If, as described, only a part of the backrest is displaced, this has proved to be space-saving within a vehicle cabin, particularly in relation to a solution which proposes rotation of the whole vehicle seat around an axis in the seat height direction. This is particularly relevant in view of the developments in recent years which have led to vehicles such as tractors becoming heavier and heavier as a result of additional functions and extensions and their wheels becoming wider and wider, without, however, allowing the overall width of the vehicle to increase, as otherwise its approval for road use would be compromised.

If the displacement of the second part of the backrest is to be reversed, it is known so far from the prior art, for example, that the second part of the backrest has to be pushed back manually. The disadvantage of these previous solutions is that the driver has to remove his hand from the steering wheel and then turn his back in the opposite direction in order to be able to initiate this backwards displacement.

SUMMARY

It is therefore an object of this invention to further develop a generic vehicle seat in such a manner that the backwards displacement can be initiated as easily and as quickly as possible.

The object of the invention is solved by a vehicle seat having a seat part and a backrest part comprising a first backrest portion and a second backrest portion arranged thereabove in the seat height direction, wherein the second backrest portion is displaceable relative to the first backrest portion by means of a displacement movement directed at least in the seat width direction. According to the invention, in a first displaced position of the second backrest portion, a mechanical interaction is formed between the first backrest portion and the second backrest portion, which secures the first displaced position of the second backrest portion and which can be released by means of a force exerted on the second backrest portion and acting in the direction of the displacement movement.

As a result, the force can be applied to the second backrest portion, which triggers its displacement movement, for example starting from an initial position as a non-displaced position, in the same direction as the force which initiates its backwards displacement movement, for example starting from the first displaced position. For example, the driver must move the second backrest portion once using his right shoulder (case 1) (or left shoulder, case 2) to initiate the displacement movement, and accordingly press again using his right shoulder (case 1) (or left shoulder, case 2) to initiate the backwards displacement movement, wherein in both operations the direction vector of the force starting from the left shoulder (case 1) (or right shoulder, case 2) follows at least the displacement movement and/or is substantially equal to it. "Substantially equal" in this context means considering that, in the initial position, the second backrest portion may have a different alignment in relation to the driver and/or seat width direction.

The fact that the displacement movement is directed at least in the seat width direction means that the direction of this displacement movement has only or at least fractions pointing in the seat width direction; however, it may also have additional fractions pointing in the seat length direction and/or seat height. The direction of the displacement movement preferably always has a fraction in the same seat width direction, i.e. it is at least proportionally directed either in the left seat width direction or in the right seat width direction, but not in the left and right directions of the seat width.

It is advantageous that the second backrest portion can be arranged relative to the first backrest portion in such a manner that the vehicle driver sitting on the vehicle seat is supported at least at the level of his shoulder and/or chest region off-centre laterally of the backrest during a laterally or rearwardly aligned seated working posture.

The second backrest portion is therefore configured in such a manner that it is arranged above the first backrest portion in the seat height direction. In addition, the second backrest portion is preferably configured in such a manner that, at least in the initial position, it is free of portions which are arranged in such a manner that they protrude beyond the boundary surfaces of the first backrest portion in the seat length direction and/or in the seat width direction.

The first backrest portion may be connected to the seat part either rigidly or pivotally around an axis which is preferably arranged in the seat width direction. The seat part and therewith the entire vehicle seat may be connected either rigidly or pivotally around an axis which is preferably arranged in the seat height direction to a seat substructure which is rigidly connected, for example, to the bodywork of the vehicle.

Preferably the two lateral, the front and/or the rear boundary surfaces of the second backrest portion each represent a steady geometric continuation of the corresponding boundary surfaces of the first backrest portion, which is optionally interrupted by a separation gap between the first and the second backrest portion. The lateral, front and/or rear boundary surfaces of the second backrest portion may therefore in each case preferably be described by the same spatial surface equation as their corresponding counterparts from the boundary surfaces of the first backrest portion.

It is therefore preferably provided that the second backrest portion can be moved either to the left or to the right or even in both directions relative to the first backrest portion. For example, it would be conceivable that a right-handed driver would prefer a displacement movement whose direction points to the right seat width direction in order to be able to support the left shoulder. However, it is easy for a person skilled in the art to develop a mirror-inverted vehicle seat in order also to provide a suitable seat for a left-handed driver.

Preferably, the second backrest portion can be substantially displaced to half of its overall width in relation to the first backrest portion. It is advantageous that the direction of the displacement movement is not constant over the entire duration of the displacement movement; i.e. the direction of the displacement movement preferably does not follow a straight line but, for example, a two- or three-dimensional curve or a curve having different portions which can be straight or curved.

Preferably the first displaced position is the only displaced position which is secured by means of the mechanical interaction described above. There is preferably at least one extreme position in which the second backrest portion is maximally displaced in relation to the first backrest portion. The first displaced position is preferably not this extreme position.

In order to secure the relative position of the second backrest portion in relation to the first backrest portion in the first displaced position, a locking device is preferably provided which preferably comprises a first locking portion arranged on the first backrest portion and a second locking portion arranged on the second backrest portion, wherein the first locking portion preferably comprises a curve slot having guide curve portions within which a first end of a hook member of the second locking portion is guidable and which has a locking position at which the hook member is lockable. The curve slot is preferably part of a slot member which, for example, is configured as a cast part or a cutting part.

It is therefore intended that the hook member moves in relation to the curve slot during the displacement and/or backwards displacement movement, e.g. moves towards or away from the curve slot, while the curve slot does not change its position. In the initial position of the second backrest portion, the hook member is preferably spaced apart from the curve slot, i.e. it is not in engagement therewith.

In the process of the displacement movement, the hook member is therefore brought into engagement with the curve slot. Preferably the hook member is arranged in such a manner that the engagement with the curve slot occurs automatically as soon as the second backrest portion is displaced sufficiently far in relation to the first backrest portion. There is therefore advantageously a second displaced position of the second backrest portion, in which the first end of the hook member is arranged directly adjacent to an entrance of the curve slot. The curve slot preferably has only one single entrance and is otherwise formed as a closed curve slot. Due to the special shape of the curve slot, it can also be referred to as a "heart curve".

In order to be able to move the first end of the hook member within the curve slot, it is intended according to an advantageous embodiment that the hook member of the second locking portion is mounted by means of a second end pivotably around an axis which is preferably perpendicular to the curve slot in the first displaced position of the second backrest portion. Preferably the hook member has only this one rotational degree of freedom and/or no translational degrees of freedom.

Preferably a spring member is additionally arranged and is connected to the second end of the hook member and to a middle portion of the hook member. This spring member is, for example, configured as an elastic plastic part and serves to secure the position of a starting position of the hook member when it is not yet engaged with the curve slot. Preferably, due to its elastic properties, this spring member allows the hook member to rotate around the axis to the extent required by the shape of the curve slot, and otherwise returns the hook member to its starting position when its first end is no longer in engagement with the curve slot. This is the case, for example, when the second backrest portion has assumed the second displaced position again during the backwards displacement movement.

It should be mentioned that in the sense of the present invention, the terms "first displaced position", "second displaced position", etc. do not allow any statement to be made about the chronological order in which the second backrest portion occupies these displaced positions starting from the initial position in the displacement movement or in the backwards displacement movement. During the displacement movement starting from the initial position, preferably the second displaced position is reached first, then a first of the extreme positions and then the first displaced position, which is secured. If the backwards displacement movement is initiated as described above and the securing of the first displaced position is cancelled, the second backrest portion, starting from the first displaced position, first reaches a second of the extreme positions and then the first displaced position again before returning to the initial position.

Preferably, the interaction between the hook member and the curve slot ensures that the movement of the hook member within the curve slot is always only possible in one direction, for example, clockwise, but not counterclockwise. The curve slot preferably comprises a stop member which prevents the hook member from being returned from the first displaced position to the first extreme position.

A further advantage is that the hook member is arranged in such a manner that its first end is in contact with the rear boundary surface when running along its path through the curve slot. In addition, it is advantageous if the rear boundary surface of the curve slot has step portions which are arranged successively along the direction of the path, wherein each step portion is configured to decrease in relation to the step portion preceding it in the direction of the path. This also prevents the first end of the hook member from being returned in the opposite direction to the path (e.g. counterclockwise).

In order to enable an automatic return of the second backrest portion to the initial position, it has proved to be advantageous to provide a reset device comprising an energy-storing member connected to the first backrest portion and to the second backrest portion, said energy-storing member being adapted and formed in such a manner that a first amount of energy provided from the displacement movement of the second backrest portion relative to the first backrest portion is stored and is provided for performing a backwards displacement movement of the second backrest portion relative to the first backrest portion.

The energy, which is consumed by means of the displacement movement, can therefore preferably be stored at least temporarily by means of the energy-storing member. An estimation of the amount of energy can be made using the product of the overall path of the second backrest portion, which is performed by means of the displacement movement, and the force required for this.

Preferably the energy-storing member is configured in the form of a spring member, for example, a band spring member or a tension spring member. This spring member, for example, is stretched during the displacement movement and automatically contracts again after the mechanical securing is released, so that the energy is released again.

A further advantage is when a damping device is arranged between the first backrest portion and the second backrest portion, said damping device being adapted and formed to dissipate an excess second amount of energy provided during the backwards displacement movement of the second backrest portion relative to the first backrest portion. This excess amount of energy originates, for example, from the pretension of the energy-storing member.

For example, the damping device is configured as a viscous brake (silicone brake) with a freewheel (in the direction of the displacement movement), which preferably generates friction by converting the linear movement of the second backrest portion into a rotational movement of brake discs mounted in fluid and therefore dissipates energy. Alternatively, it can be configured as a linear damper. The damping device increases the comfort for the user, as the backwards displacement movement is able to run smoothly.

In order to realise the described movement processes and at the same time to provide simplified mechanics, it has proved to be advantageous if a fastening member of the energy-storing member, the first locking portion and/or the damping device are mounted and/or rigidly arranged relative to one another on a common mounting member connected to the first backrest portion. The mounting member is preferably rigidly connected to the first backrest portion, for example, via a flange member.

Further, the second backrest portion is preferably fastened to the first backrest portion by means of a guide device, wherein the displacement movement of the second backrest portion can be performed by means of the guide device.

Furthermore, the guide device preferably comprises the mounting member and two rod-shaped guide members arranged spaced apart from one another in the seat height direction, wherein the mounting member is mounted sliding and/or rolling relative to at least one of the guide members. The guide members of the guide device are preferably rigidly connected to the second backrest portion and/or arranged over its entire width (in the seat width direction).

Preferably, the direction of the displacement movement is configured according to the progression of the guide members. The guide members preferably have a curvature which, in relation to its overall width, is configured at least in the initial position of the second backrest portion pointing in the seat height direction, for example upwards, and/or in the seat length direction, for example to the rear.

By means of the slide bearing, the mounting member can thus be moved relative to the guide members and the displacement movement of the second backrest portion can therefore be performed.

In the sense of the present invention, the terms "axis" and "plane" are used in particular also in the virtual sense. The axis and planes mentioned here do not necessarily have to be formed by a mechanical member, but can also be virtual reference members for a better understanding of the geometry of the vehicle seat.

BRIEF DESCRIPTION OF THE DRAWINGS

Further advantages, goals and characteristics of the present invention are explained with reference to the attached drawings and the following description, in which different embodiments of the vehicle seat according to the invention are shown and described by way of example. In the drawings:

FIG. 1$a$ is a front view of a vehicle seat according to the invention having the second backrest portion in a first displaced position;

FIG. 1$b$ is a front view of the vehicle seat from FIG. 1$a$ having the second backrest portion in an initial position;

FIG. 3$a$ is a side view of the vehicle seat from FIG. 1$a$ having the second backrest portion in the first displaced position;

FIG. 3$b$ is a side view of the vehicle seat from FIG. 1$a$ having the second backrest portion in the initial position;

FIG. 4$a$ is a sectional view E1-E1 through the vehicle seat according to FIG. 3$b$ along the marked plane;

FIG. 4$b$ is a sectional view E2-E2 through the vehicle seat according to FIG. 1$b$ along the marked plane;

FIG. 5$a$ is a sectional view E3-E3 through the vehicle seat according to FIG. 2 along the marked plane;

FIG. 5$b$ is a detailed view of FIG. 5$a$;

FIG. 6$a$, 6$b$ are top views of a slot member having a curve slot;

FIG. 6$c$ is a perspective view of the slot member according to FIGS. 6$a$ and 6$b$.

DETAILED DESCRIPTION

Part of the drawings is in each case a Cartesian coordinate system consisting of the axis 1$x$ (seat length direction, arrow direction from front to rear), 1$y$ (seat width direction, arrow direction from left to right) and 1$z$ (seat height direction, arrow direction from top to bottom). Also marked is a virtual plane A, which is spanned by the axis 1$x$ and 1$z$ and divides the vehicle seat 1 in the middle in the seat width direction 1$y$.

Figure 1A:
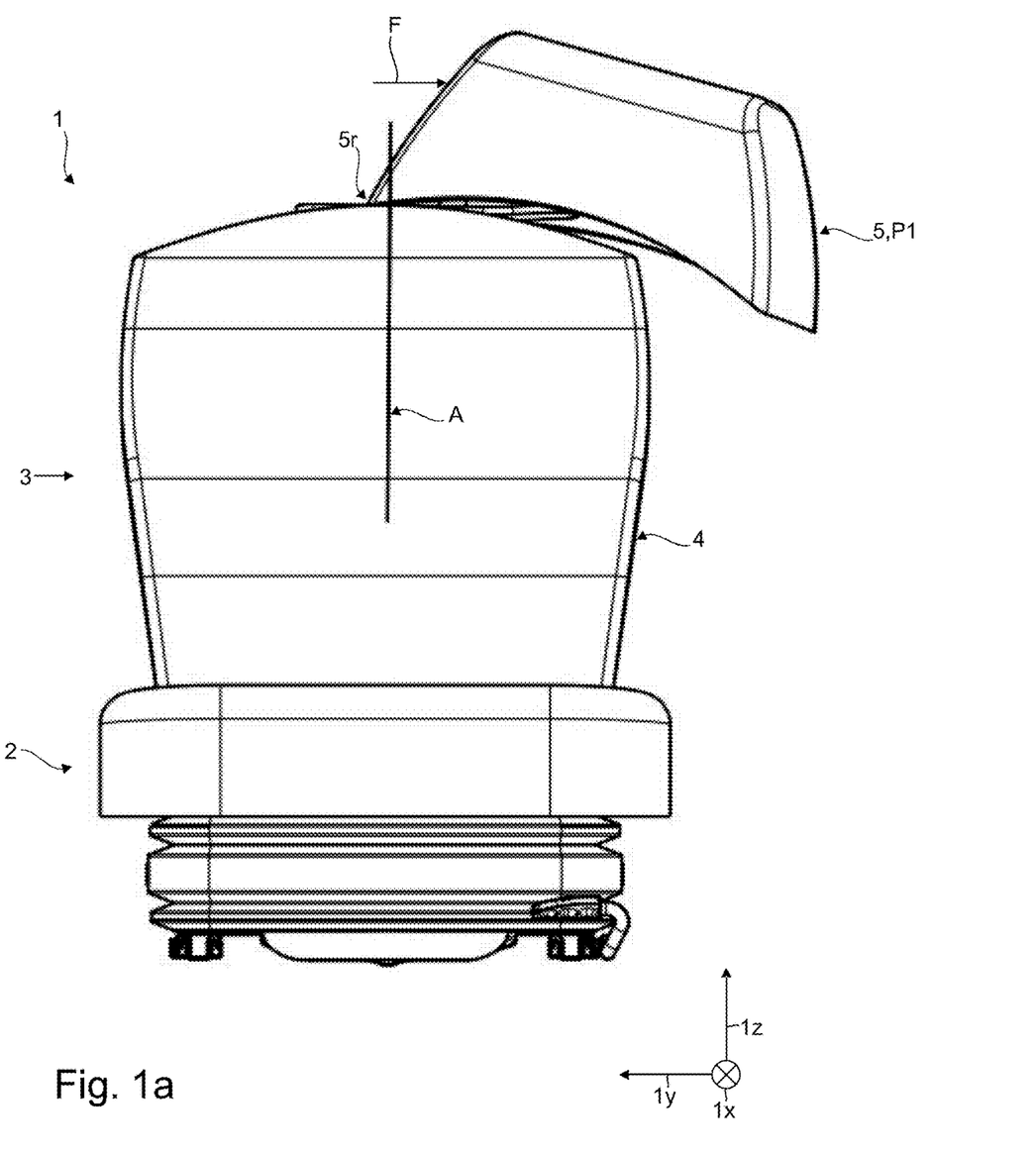
Figure 1B:
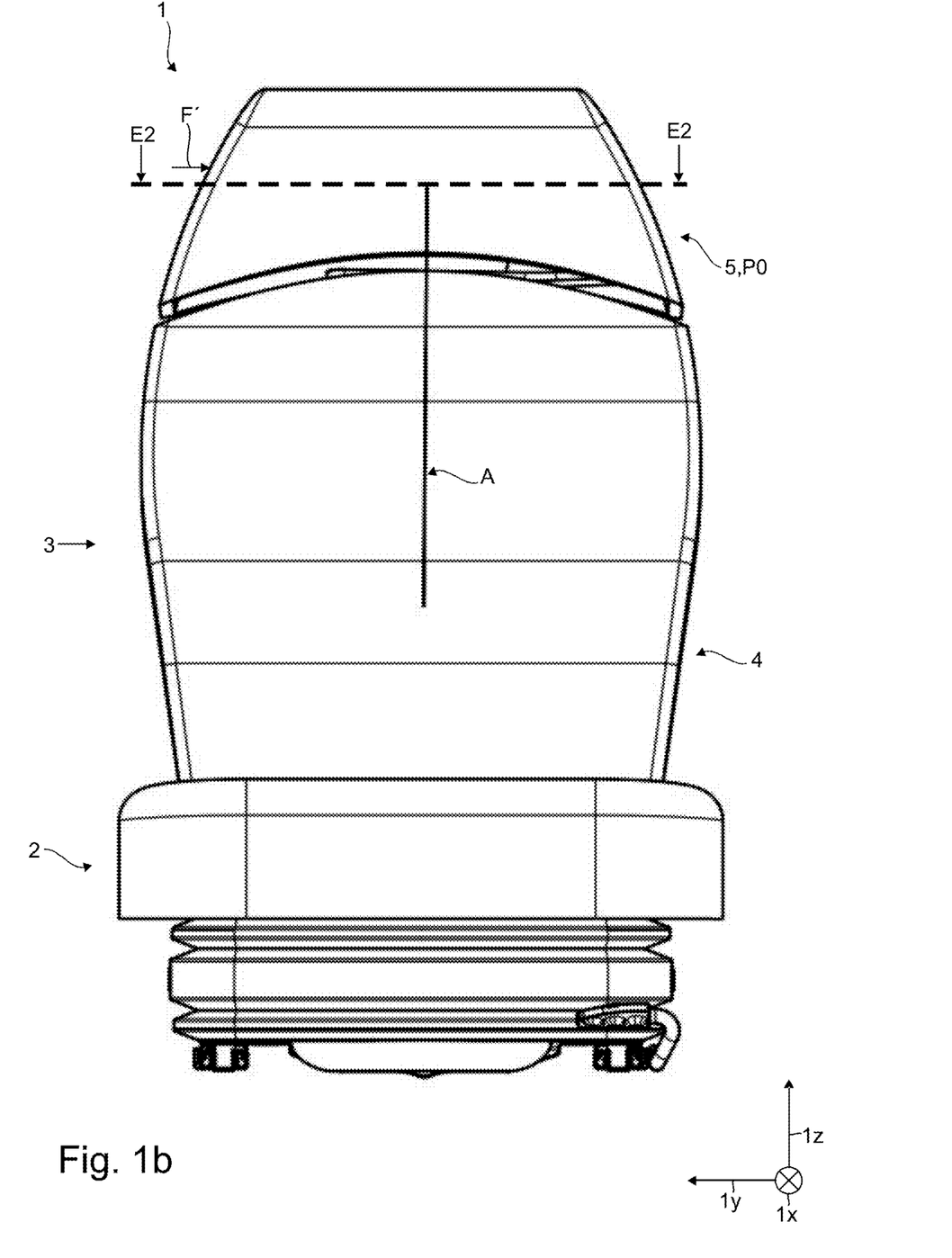
Figure 2:
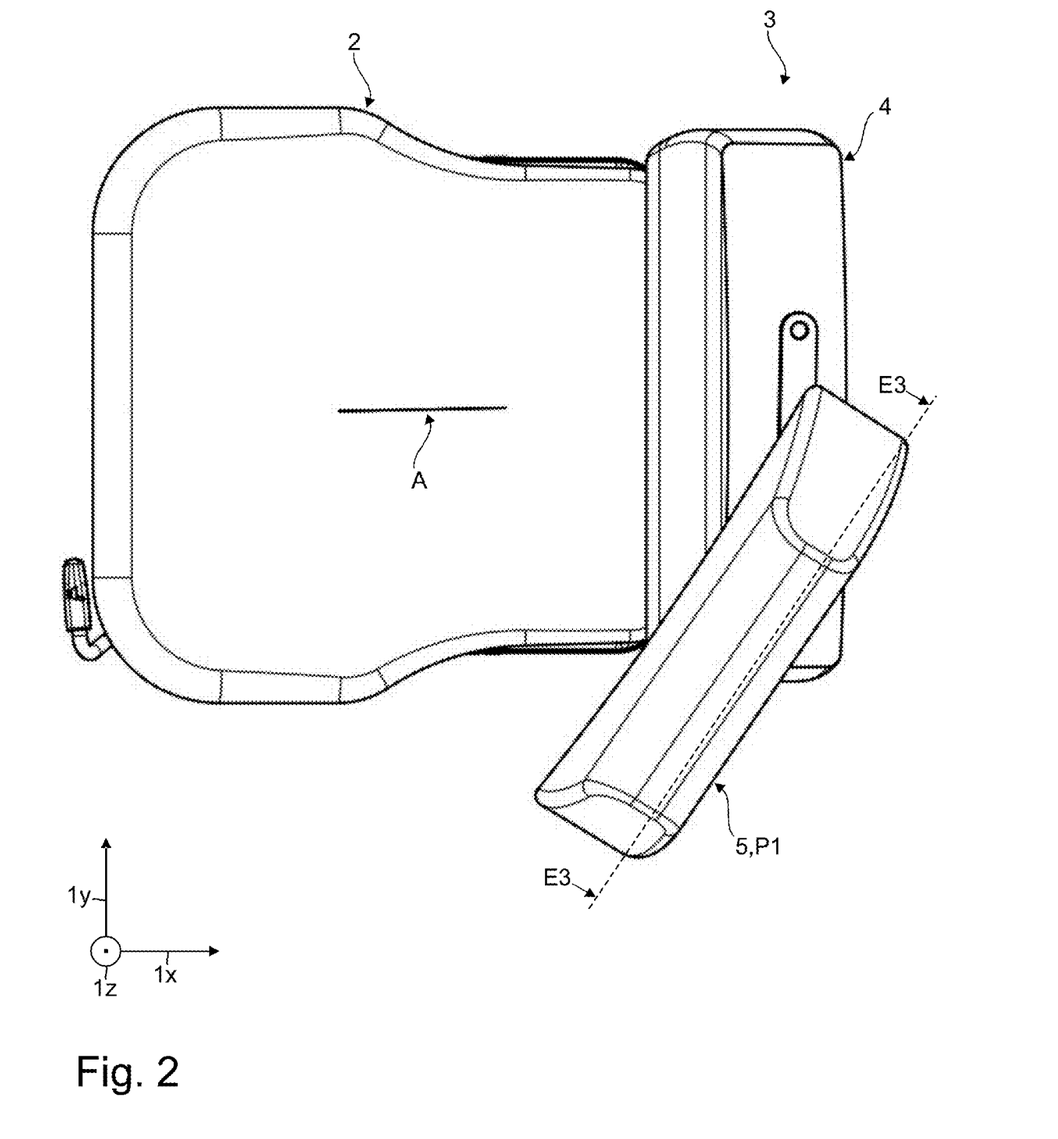
FIG. 2 is a front view of the vehicle seat from FIG. 1$a$ having the second backrest portion in the first displaced position.
Figure 3A:
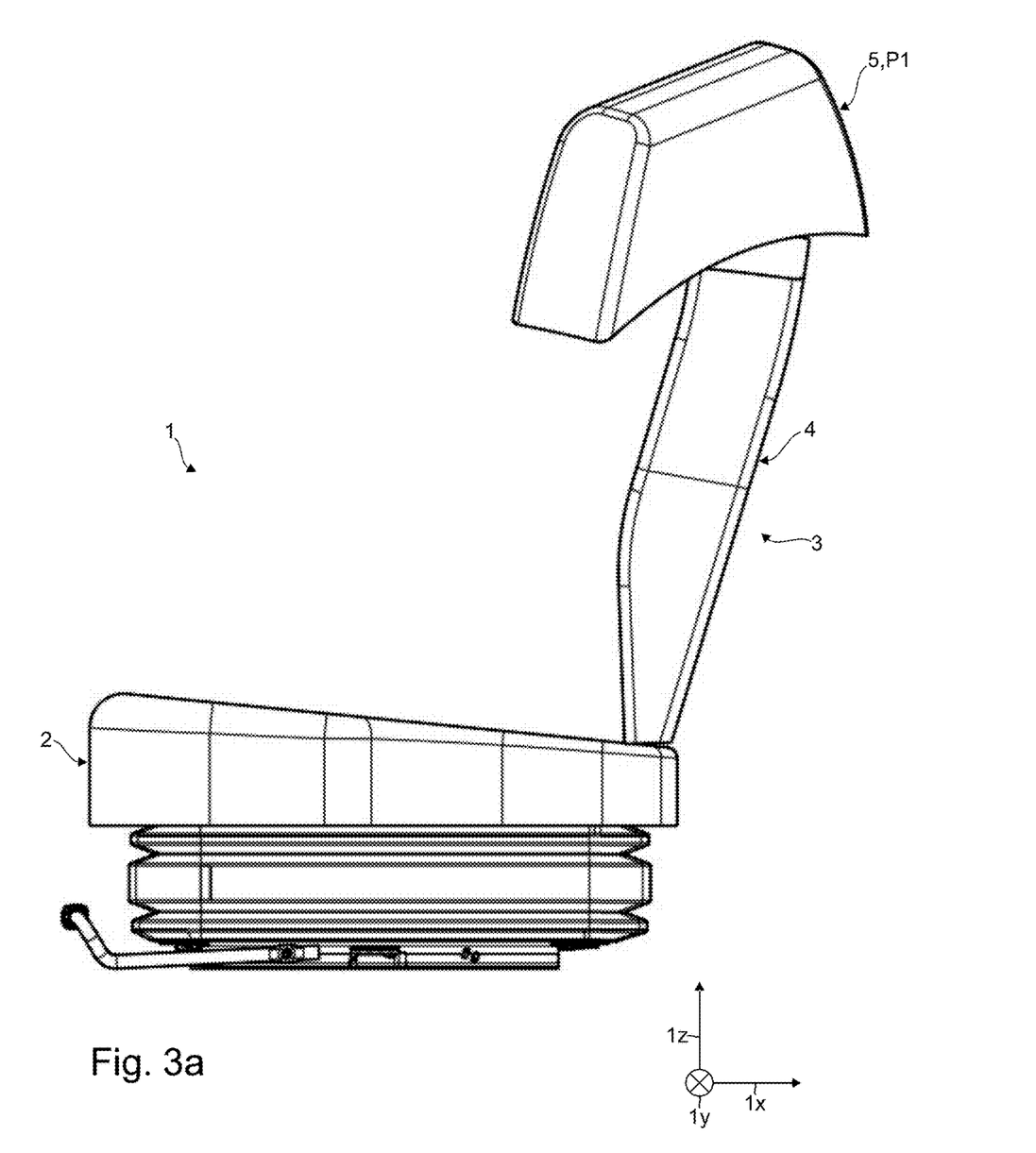
Figure 3B:
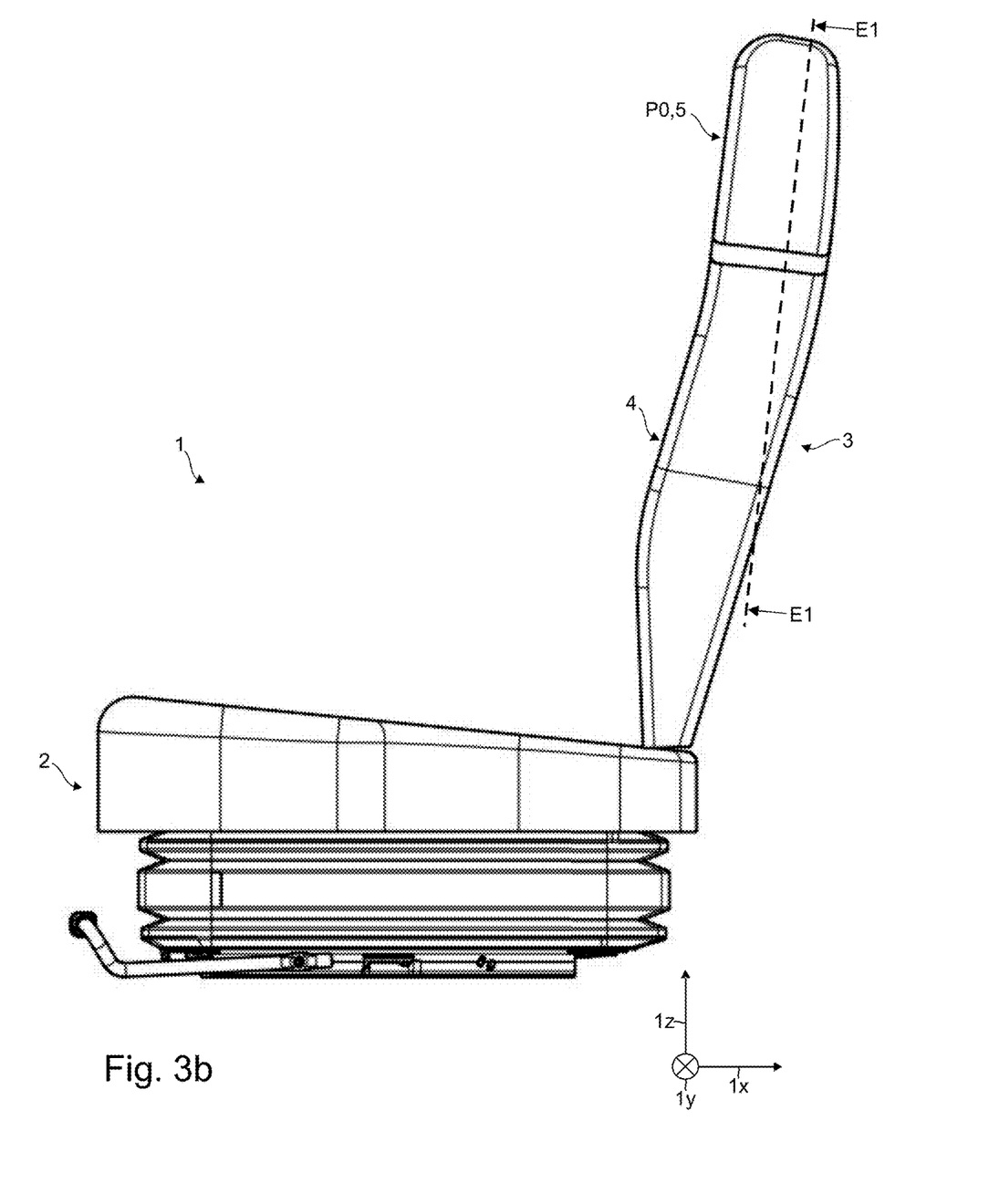

FIGS. 1$b$, 3$b$, 4$a$ and 4$b$ each show an initial position PO of the second backrest portion 5. FIG. 1$a$, 2, 3$a$, 5$a$ and 5$b$ each show a first displaced position P1 of the second backrest portion 5.

In particular, FIG. 1$a$ to 3$b$ show a vehicle seat 1 according to the invention having a seat part 2 and a backrest part 3, which comprises a first backrest portion 4 and a second backrest portion 5 arranged above it in the seat height direction 1$z$. The second backrest portion 5 can be displaced in relation to the first backrest portion 4 by means of a displacement movement directed at least in the seat width direction 1$y$.

Figure 5A:
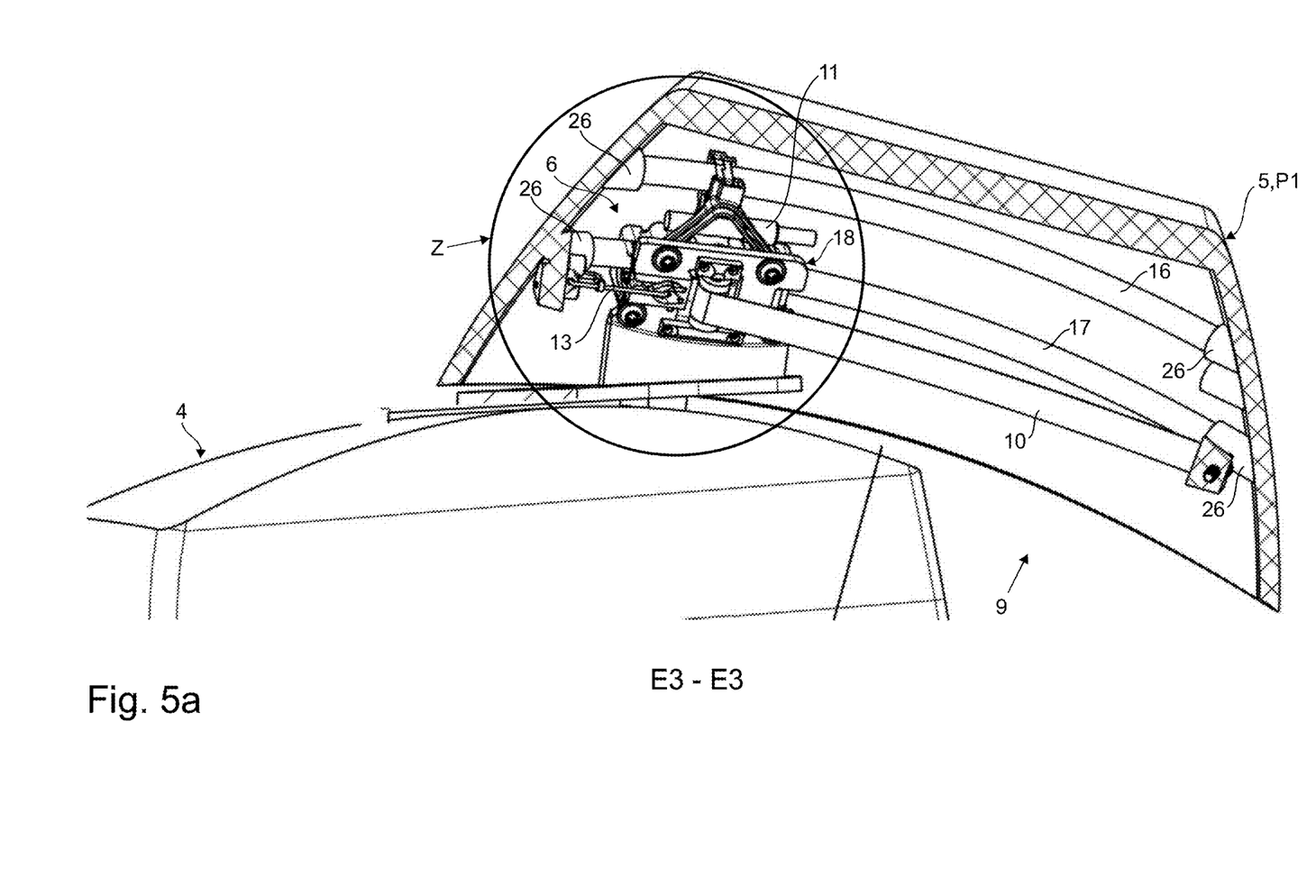
Figure 5B:
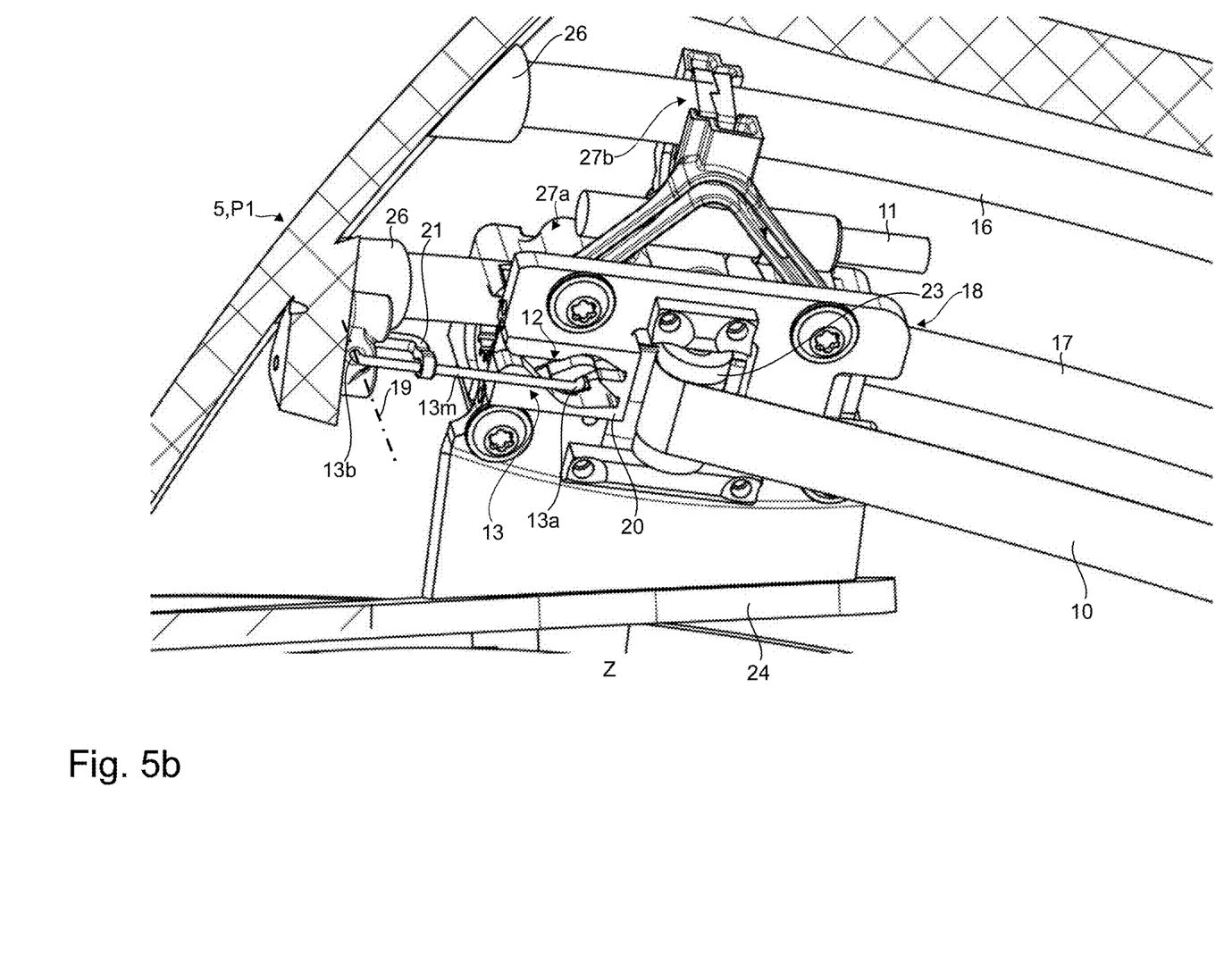

FIGS. 5$a$ and 5$b$ show that, in a first displaced position P1 of the second backrest portion 5, a mechanical interaction is formed between the first backrest portion 4 and the second backrest portion 5, which secures the first displaced position P1 of the second backrest portion 5 and which can be released by means of a force F exerted on the second backrest portion 5 and acting in the direction of the displacement movement. An example of a direction vector for the force F is shown in FIG. 1$a$.

A comparison of FIGS. 1$a$ and 1$b$ shows that a force F' can be applied to the second backrest portion 5, which triggers its displacement movement, for example, starting from the initial position PO as a non-displaced position, in the same direction as the force F, which initiates its backwards displacement movement, for example, starting from the first displaced position P1, wherein the direction vector of the forces F and F' is substantially equal. "Substantially equal" in this context means taking account of the fact that the second backrest portion 5, in the initial position P0, has a different alignment in relation to the driver and/or to the seat width direction 1y compared to the first displaced position P1.

In this case, a seat 1 is shown in which the second backrest portion 5 can be displaced through pressure with the right shoulder. Thus the forces F and F', as well as the displacement movement, have only or at least fractions pointing in the seat width direction 1y; in addition, they may have additional fractions pointing in the seat length direction 1x and/or in the seat height direction 1z. In this case, the direction of the displacement movement always has a fraction in the right seat width direction 1y.

The second backrest portion 5 can thus be moved from the initial position P0 to the left, but not in both directions in relation to the first backrest portion 4.

In this case, the second backrest portion 5 is displaceable substantially up to half of its overall width relative to the first backrest portion 4 (see illustration according to FIG. 1a, according to which the plane A intersects the second backrest portion 5 at its lateral right end 5r). The maximally displaced position P3 or P4 (extreme position, see explanation below) is not shown in the drawings. In this case, the direction of the displacement movement is not constant over the entire progression of the displacement movement.

In this case, the first displaced position P1 is the only displaced position secured by means of the mechanical interaction described above. There are two extreme positions P3 and P4 (see explanations to FIG. 6b below), in which the second backrest portion 5 is maximally displaced and is therefore further than in the first displaced position P1 in relation to the first backrest portion 4. In this case, the first displaced position P1 is not one of these extreme positions P3 and P4.

FIGS. 4a, 4b, 5a and 5b show that a locking device 6 is provided, which comprises in the present case a first locking portion 7 arranged on the first backrest portion 4 and a second locking portion 8 arranged on the second backrest portion 5.

Figure 6A:
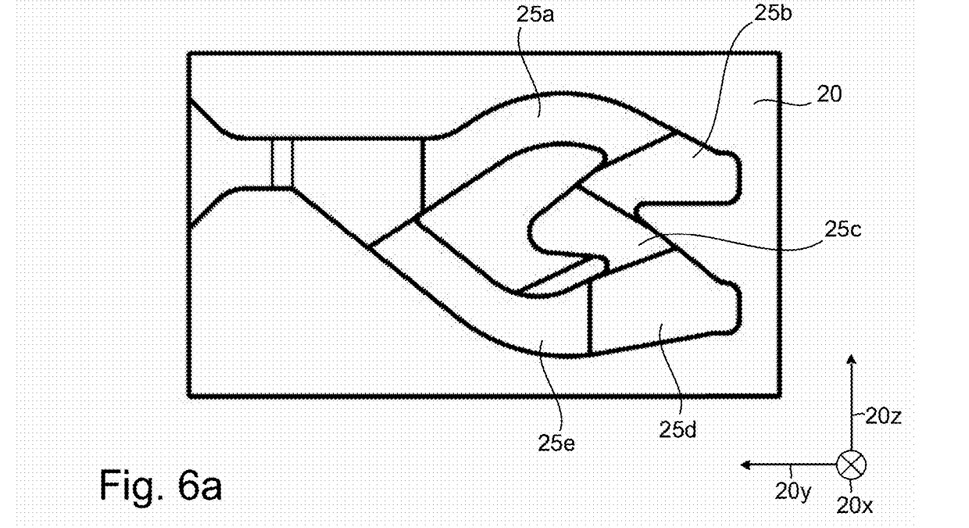
Figure 6B:
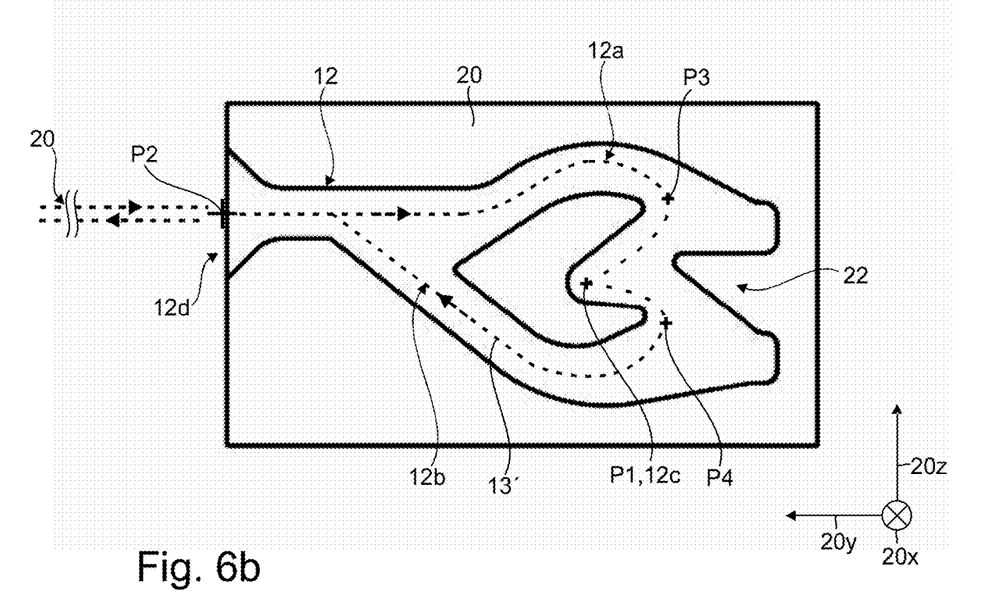
Figure 6C:
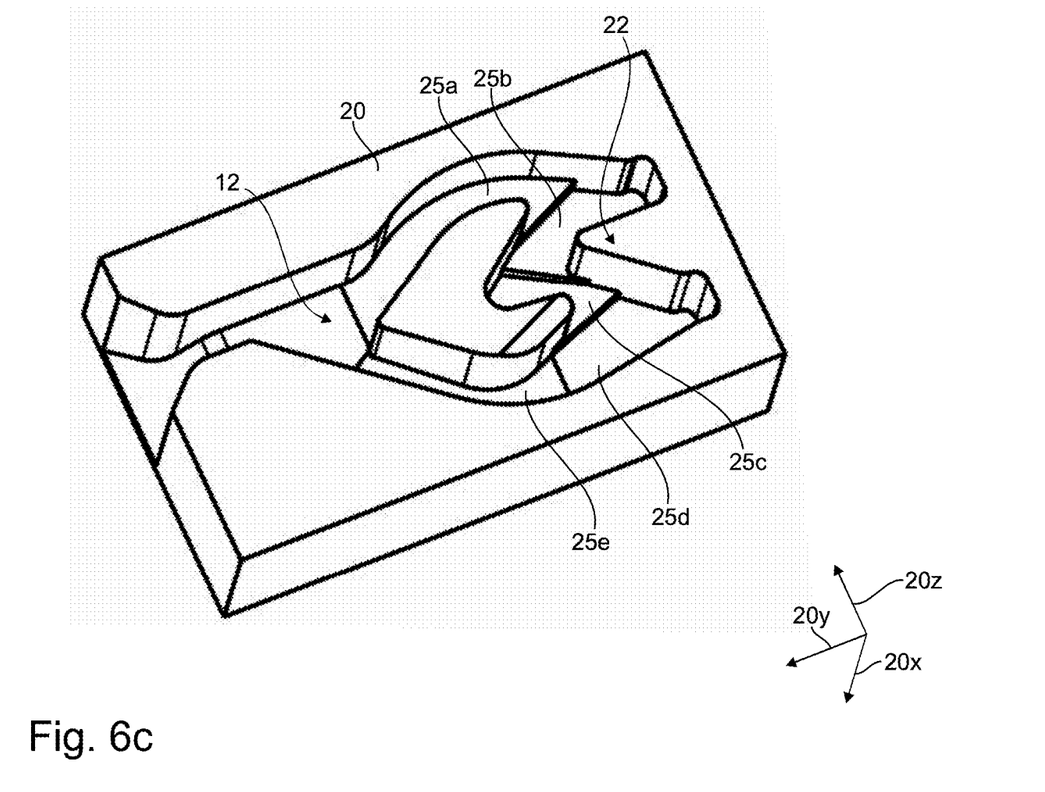

The first locking portion 7 comprises, according to FIG. 6a-c, a curve slot 12 which has guide curve portions 12a, 12b, within which a first end 13a of a hook member 13 (not shown in FIG. 6a-c, see here in particular FIG. 5a) of the second locking portion 8 can be guided, and which has a locking position 12c, at which the hook member 13 can be locked. This locking device 6 is intended to secure the relative position of the second backrest portion 5 relative to the first backrest portion 4 in the first displaced position P1. In this case, the curve slot 12 is part of a slot member 20 which is configured, for example, as a cast part or a cutting part. A possible material would be a zinc alloy or AlCuMgPb (material number 3.1645), for example.

It is therefore intended that the hook member 13 moves in relation to the curve slot 12 during the displacement and/or backwards displacement movement, e.g. moves towards or away from the curve slot, while the curve slot 12 does not change its position. In this case, the hook member 13 in the initial position P0 of the second backrest portion 5 is at a distance from the curve slot 12, i.e. it is not in engagement with it (see illustrations according to FIGS. 4a and 4b).

In the process of the displacement movement, the hook member 13 is therefore brought into engagement with the curve slot 12. In this case, the hook member 13 is arranged in such a manner that the engagement with the curve slot 12 occurs automatically as soon as the second backrest portion 5 is displaced sufficiently far from the first backrest portion 4. In this case, there is a second displaced position P2 of the second backrest portion 5, in which the first end of the hook member 13 is arranged directly adjacent to an entrance 12d of the curve slot 12 (see FIG. 6b).

In this case, the curve slot 12 has only one single entrance 12d and is otherwise formed as a closed curve slot. Due to the special shape of the curve slot 12, it can also be referred to as a "heart curve" (see also the illustration according to FIG. 6b).

In order to be able to move the first end of the hook member 13 within the curve slot 12, it is provided that the hook member 13 of the second locking portion 8 is mounted by means of a second end 13b pivotably around an axis 19 which is arranged perpendicularly to the curve slot 12 in the first displaced position P1 of the second backrest portion 5 (see FIGS. 5a and 5b). In this case, the hook member 13 has only this one rotational degree of freedom and no translational degrees of freedom.

In this case, a spring member 21 is additionally arranged, said spring member 21 being connected to the second end 13b of the hook member 13 and to a middle portion 13m of the hook member 13. In this example, this spring member 21 is configured as an elastic plastic part and serves to secure the position of a starting position of the hook member 13 when it is not yet engaged with the curve slot 12 (as shown, for example, in FIGS. 4a and 4b). In this case, due to its elastic properties, this spring member 21 allows the hook member 13 to rotate around the axis 19 at least to the extent required by the shape of the curve slot 12, and otherwise returns the hook member 13 to its starting position when its first end 13a is no longer in engagement with the curve slot 12. This is the case, for example, when the second backrest portion 5 has assumed the second displaced position P2 again during the backwards displacement movement.

FIG. 6a, 6b, 6c show a slot member 20 within which the curve slot 12 is arranged. Also shown is a Cartesian coordinate system having the axis 20x (length direction of the slot member 20), 20y (width direction of the slot member 20) and 20z (height direction of the slot member 20). FIG. 6a shows a top view of the slot member 20 having a rear boundary surface 25 of the curve slot 12, which thus limits the curve slot in the length direction 20x of the slot member 20. FIG. 6b shows the top view of the slot member 20 without details of the rear boundary surface 25. FIG. 6c shows a perspective view of the slot member 20.

The dotted line shows a path 13' of the first end 13a of the hook member 13, which travels this during a displacement or backward displacement movement of the upper backrest portion 5. The path 13' is arranged in such a manner that it runs parallel or substantially parallel to the rear boundary surface 25.

Different positions P0, P1, P2, P3 and P4 are marked thereby, which represent positions of the upper backrest portion 5 corresponding to the respective position of the first end 13a of the hook member 13. The position P1 is also the locking position 12c of the first end 13a of the hook member 13; i.e. if the upper backrest portion 5 is in its first displaced position P1, the first end 13a of the hook member 13 is in the locking position 12c.

For the displacement movement starting from the initial position P0, the second displaced position P2 is reached first, then a first P3 of the extreme positions and then the first displaced position P1, which is secured. If the backwards displacement movement is initiated as described above and the securing of the first displaced position P1 is cancelled, the second backrest portion 5, starting from the first displaced position P1, first reaches a second P4 of the extreme positions and then the first displaced position P2 again before returning to the initial position P0.

In this case, the interaction between the hook member 13 and the curve slot 12 ensures that the movement, i.e. the path 13' of the hook member 13 within the curve slot 12, is always only possible clockwise, but not counterclockwise. In this case, the curve slot 12 comprises a stop member 22 which prevents the hook member 13 from being returned from the first displaced position P1 to the first extreme position P3.

Also the hook member 13 is arranged in such a manner that its first end 12a is in contact with the rear boundary surface 25 when running along its path 13' through the curve slot 12. In addition, the rear boundary surface 25 of the curve slot 12 has step portions 25a-e which are arranged successively along the direction of the path 13', wherein in each case one step portion (for example 25b) is configured to decrease in relation to the step portion (for example 25a) preceding it in the direction of the path 13' and/or is configured staggered rearwardly with steps. This also prevents the first end 13a of the hook member from being returned in the opposite direction to the path 13'.

In order to enable an automatic return of the second backrest portion 5 to the initial position P0, a reset device 9 (see FIGS. 5a and 5b) is provided, which comprises an energy-storing member 10 connected to the first backrest portion 4 and the second backrest portion 5, said energy-storing member being adapted and formed in such a manner that a first amount of energy provided from the displacement movement of the second backrest portion 5 relative to the first backrest portion 4 is stored and is provided for performing a backwards displacement movement of the second backrest portion 5 relative to the first backrest portion 4.

Figure 4A:
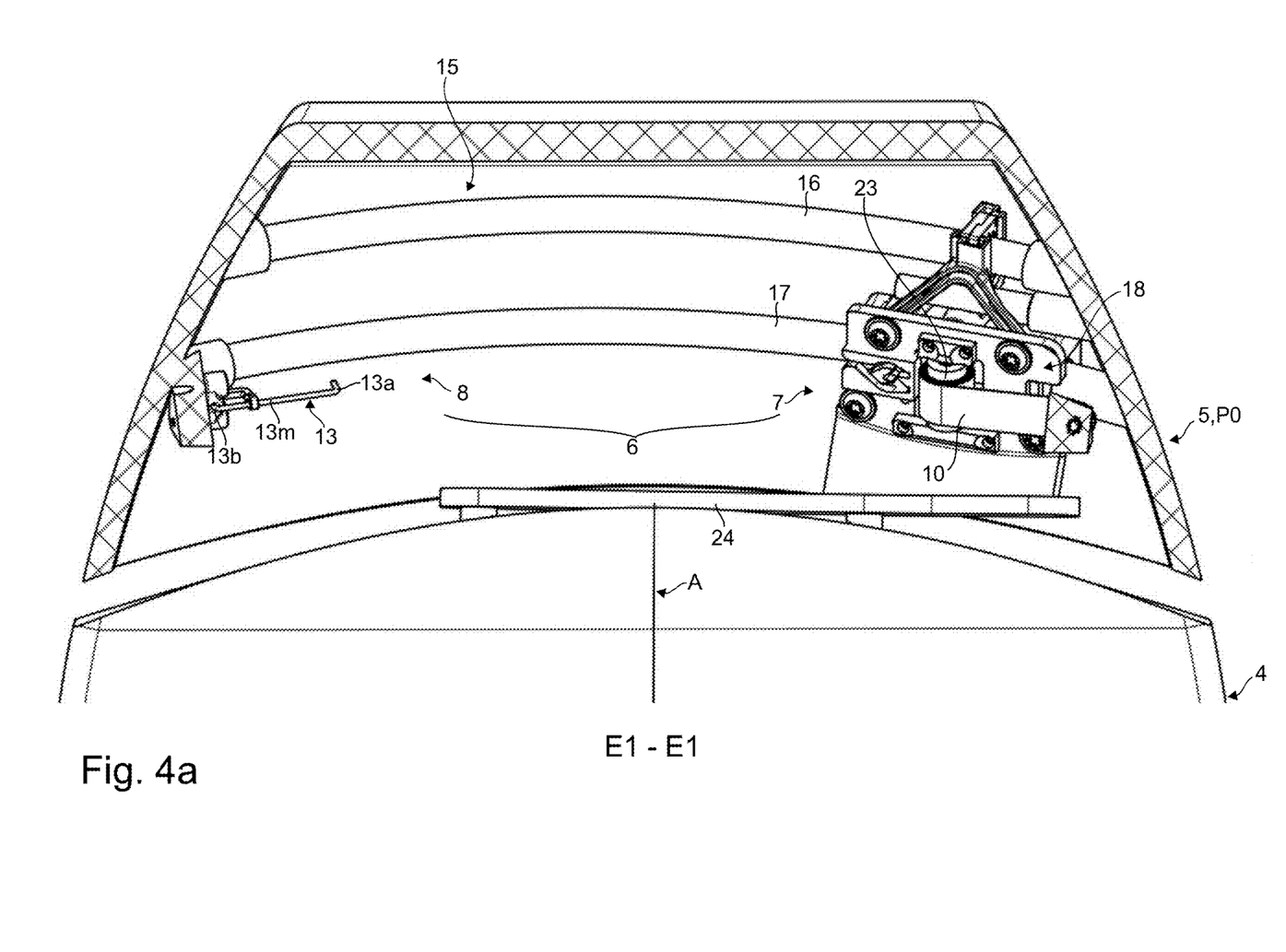
Figure 4B:
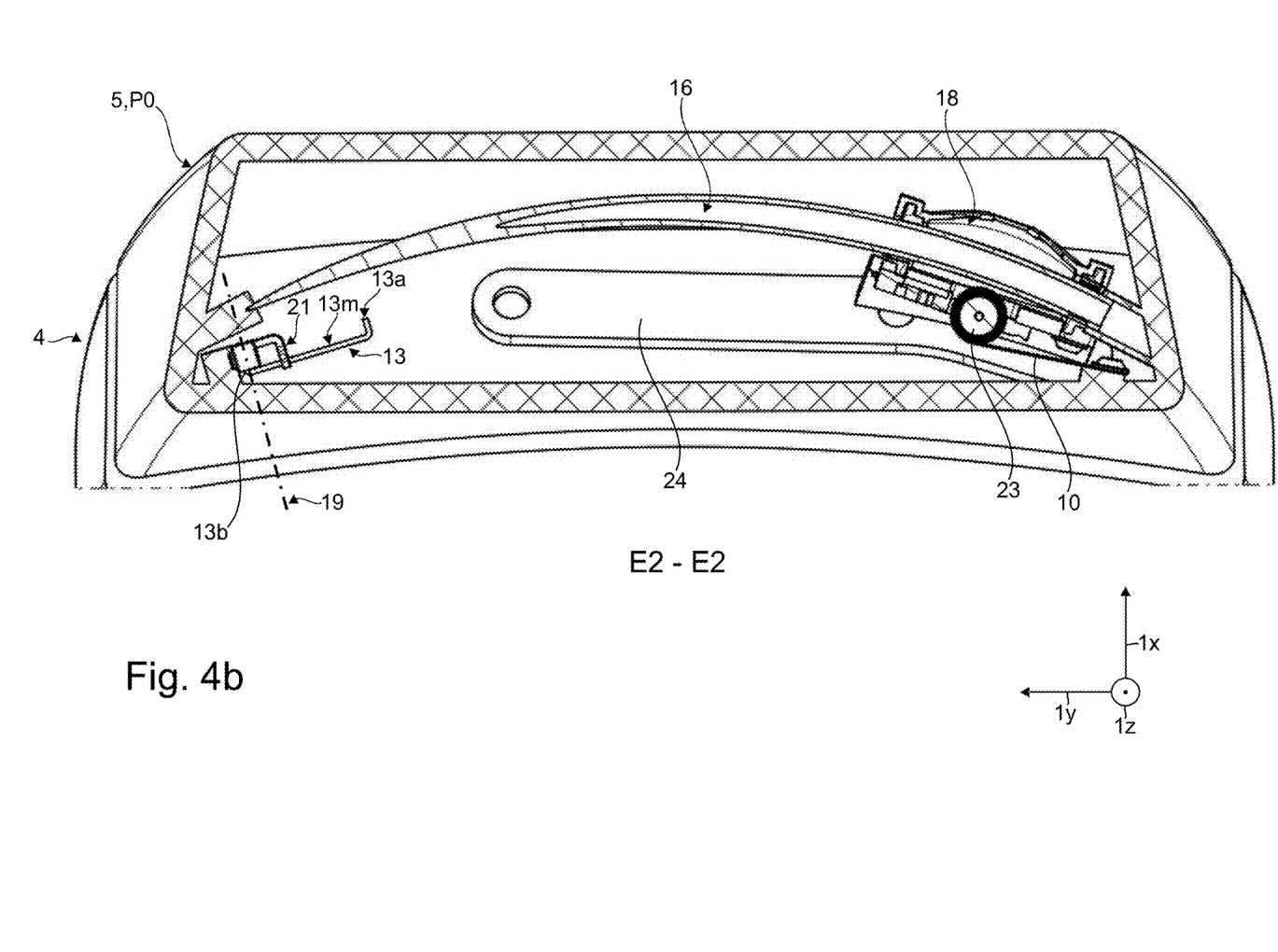

FIGS. 4a and 4b show this energy-storing member 10, which is present in the form of a band spring member, in a pretensioned state, but in an initial stance. FIGS. 5a and 5b show this energy-storing member 10 in an extended state. In the case of a band spring member, the pretension force is almost independent of the path. It would also be conceivable to incorporate a tension spring member in which its spring tension is higher in the extended (stretched) state than in the pretensioned state.

In this case, it is also shown that, between the first backrest portion 4 and the second backrest portion 5, a damping device 11 is arranged which is adapted and formed to dissipate an excess second amount of energy provided during the backwards displacement movement of the second backrest portion 5 relative to the first backrest portion 4. In this case, the damping device 11 is configured as a linear damper.

In this case, a fastening member 23 of the energy-storing member 10, the first locking portion 7 and/or the damping device 11 are mounted on a common mounting member 18 connected to the first backrest portion 4 and are rigidly arranged relative to one another. It is shown that the mounting member 18 is rigidly connected to the first backrest portion 4 via a flange member 24.

In this case, the second backrest portion 5 is further fastened to the first backrest portion 4 by means of a guide device 15, wherein the displacement movement of the second backrest portion 5 can be performed by means of the guide device 15.

Furthermore, the guide device 15 comprises the mounting member 18 and two rod-shaped guide members 16, 17 arranged at a distance from one another in the seat height direction 1z, wherein the mounting member 18 is slidably mounted relative to both guide members 16, 17 by means of a sliding bearing 27. In this case, the guide members 16, 17 have a curvature which, at least in the initial position P0 of the second backrest portion 5, is configured to point in the seat height direction 1z (see view according to FIG. 4a) and in the seat length direction (see view according to FIG. 4b).

The slide bearing 27 comprises a first slide bearing portion 27a, by means of which the mounting member 18 is slidably mounted relative to a lower 17 of the rod-shaped guide members 16, 17, and a second slide bearing portion 27b, by means of which the mounting member 18 is slidably mounted relative to an upper 16 of the rod-shaped guide members 16, 17. In this case, the damping device 11 is arranged between the two guide members 16 and 17 in the seat height direction 1z.

In this case, the ends of the guide members 16, 17 are each rigidly connected via sleeves 26 to the second backrest portion 5 and are arranged over its entire width (in the seat width direction 1y).

It is understood that the above embodiment is merely an initial configuration of the vehicle seat according to the invention. In this respect, the configuration of the invention is not limited to this embodiment.

All the features disclosed in the application documents are claimed as being essential to the invention, provided that, individually or in combination, they are novel over the prior art.

LIST OF REFERENCE SIGNS 1 vehicle seat
1x seat length direction
1y seat width direction
1z seat height direction
2 seat part
3 backrest part
4, 5 backrest portion
5r right end
6 locking device
7, 8 locking portion
9 reset device
10 energy-storing member
11 damping device
12 curve slot
12a, 12b guide curve portion
12c locking position
13 hook member
13a, 13b end
15 guide device
16, 17 rod-shaped guide member
18 mounting member
19 axis
20 slot member
20x length direction
20y width direction
20z height direction
21 spring member
22 stop member
23 fastening member
24 flange member
25 boundary surface
25a-e step portion
26 sleeve 27 slide bearing
27a, b slide bearing portion
A, E1, E2, E3 plane
F, F' force
P0 initial position
P1 first displaced position
P2 second displaced position
P3, P4 extreme position

The invention claimed is:

1. A vehicle seat having a seat part and a backrest part which comprises a first backrest portion and a second backrest portion arranged above the first backrest portion in a seat height direction, wherein the second backrest portion is displaceable relative to the first backrest portion at least in a seat width direction, wherein,
in a first displaced position of the second backrest portion, the first backrest portion forms a mechanical interaction with the second backrest portion, wherein the mechanical interaction secures the first displaced position of the second backrest portion, and wherein the mechanical interaction releases the second backrest portion from the first displaced position when a force is exerted on the second backrest portion in the seat width direction, wherein the vehicle seat further comprises a locking device comprising a first locking portion arranged on the first backrest portion and a second locking portion arranged on the second backrest portion, wherein the first locking portion comprises a curve slot having guide curve portions within which a first end of a hook member of the second locking portion is a guidable, and having a locking position at which the hook member is lockable.

2. The vehicle seat according to claim 1, wherein the hook member of the second locking portion is pivotably mounted around an axis which, in the first displaced position of the second backrest portion, is arranged perpendicularly to the curve slot.

3. The vehicle seat according to claim 1, wherein a reset device is provided which comprises an energy-storing member connected to the first backrest portion and the second backrest portion, wherein the energy-storing member stores a first amount of energy generated by a displacement movement of the second backrest portion relative to the first backrest portion, and wherein the energy-storing member performs a backwards displacement movement of the second backrest portion relative to the first backrest portion.

4. The vehicle seat according to claim 3, wherein the energy-storing member is a spring.

5. The vehicle seat according to claim 4, wherein the spring is a band spring.

6. The vehicle seat according to claim 4, wherein the spring is a tension spring.

7. The vehicle seat according to claim 1, wherein a damping device is arranged between the first backrest portion and the second backrest portion, wherein the damping device dissipates an excess second amount of energy generated when the second backrest portion moves from the first displaced position.

8. The vehicle seat according to claim 1, wherein at least one of a fastening member of the energy-storing member, the first locking portion, or the damping device are at least one of mounted or rigidly arranged relative to one another on a mounting member connected to the first backrest portion.

9. The vehicle seat according to claim 8, wherein a guide device fastens the second backrest portion to the first backrest portion, wherein the guide device comprises the mounting member and two rod-shaped guide members arranged at a distance from one another in the seat height direction, and wherein the mounting member is mounted in at least one of a slidable and a rollable manner relative to at least one of the guide members.

10. The vehicle seat according to claim 1, wherein a guide device fastens the second backrest portion to the first backrest portion, and wherein the guide device performs the displacement movement of the second backrest portion.

11. A vehicle seat comprising:
a seat part; and
a backrest part comprising:
a first backrest portion; and
a second backrest portion arranged above the first backrest portion in a seat height direction, wherein,
the second backrest portion is displaceable relative to the first backrest portion in at least a seat width direction,
the first backrest forms a mechanical interaction with the second backrest portion when the second backrest portion is displaced from the first backrest portion into a first displaced position,
the mechanical interaction secures the second backrest portion in the first displaced position,
the mechanical interaction is configured to be released by a force exerted on the second backrest portion in a first direction,
a locking device is provided that comprises a first locking portion arranged on the first backrest portion and a second locking portion arranged on the second backrest portion,
a reset device is provided that comprises an energy-storing member connected to the first backrest portion and the second backrest portion,
a damping device is arranged between the first backrest portion and the second backrest portion, and
a fastening member of the energy-storing member, the first locking portion and/or the damping device are mounted and/or rigidly arranged relative to one another on a mounting member connected to the first backrest portion.

12. The vehicle seat according to claim 11, wherein a guide device fastens the second backrest portion to the first backrest portion, wherein the guide device comprises the mounting member and two rod-shaped guide members arranged at a distance from one another in the seat height direction, and wherein the mounting member is mounted in at least one of a slidable and a rollable manner relative to at least one of the guide members.

13. The vehicle seat according to claim 11, wherein the energy-storing member stores a first amount of energy provided from a displacement movement of the second backrest portion relative to the first backrest portion, and wherein the energy-storing member provides the first amount of energy to move the second backrest portion backward relative to the first backrest portion.

14. The vehicle seat according to claim 11, wherein the energy-storing member is a spring.

15. The vehicle seat according to claim 14, wherein the spring is a band spring.

16. The vehicle seat according to claim 14, wherein the spring is a tension spring.

17. The vehicle seat according to claim 11, wherein the damping device dissipates an excess second amount of energy generated during a backwards displacement movement of the second backrest portion relative to the first backrest portion.

* * * * *